(12) United States Patent
Jover et al.

(10) Patent No.: US 9,295,028 B2
(45) Date of Patent: Mar. 22, 2016

(54) DETECTION AND MITIGATION OF DENIAL-OF-SERVICE ATTACKS IN WIRELESS COMMUNICATION NETWORKS

(71) Applicant: AT&T Intellectual Property I, LP, Atlanta, GA (US)

(72) Inventors: Roger Piqueras Jover, New York, NY (US); Ilona Murynets, Rutherford, NJ (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 330 days.

(21) Appl. No.: 14/059,414

(22) Filed: Oct. 21, 2013

(65) Prior Publication Data

US 2016/0050574 A1    Feb. 18, 2016

(51) Int. Cl.
*H04W 68/00* (2009.01)
*H04W 64/00* (2009.01)

(52) U.S. Cl.
CPC .............. *H04W 68/00* (2013.01); *H04W 64/00* (2013.01)

(58) Field of Classification Search
CPC ............ H04L 63/1458; H04L 63/1416; H04L 2463/141; H04L 63/1408; H04L 63/1425
See application file for complete search history.

(56) References Cited

U.S. PATENT DOCUMENTS

| | | | |
|---|---|---|---|
| 5,184,349 A | 2/1993 | Riordan | |
| 5,862,487 A | 1/1999 | Fujii et al. | |
| 6,229,998 B1 | 5/2001 | Hamdy et al. | |
| 6,704,557 B1 | 3/2004 | Krishnamurthy et al. | |
| 6,944,422 B2 | 9/2005 | Fitrandolph | |
| 7,327,794 B2 | 2/2008 | Fanson et al. | |
| 7,680,450 B2 | 3/2010 | Moscovitz et al. | |
| 7,742,760 B2 | 6/2010 | Patzer et al. | |
| 8,319,615 B2 | 11/2012 | Snider et al. | |
| 2003/0171120 A1 | 9/2003 | Mustapha | |
| 2004/0005858 A1 | 1/2004 | Cervinka et al. | |
| 2004/0127230 A1* | 7/2004 | Bevan | H04W 64/00 455/456.5 |
| 2007/0280187 A1* | 12/2007 | Wang | H04L 63/1416 370/338 |
| 2010/0240392 A1* | 9/2010 | Gerstenberger | G01S 5/0009 455/456.1 |
| 2012/0155274 A1* | 6/2012 | Wang | H04W 12/12 370/236 |
| 2015/0135293 A1* | 5/2015 | Mookiah | H04L 63/1483 726/7 |

OTHER PUBLICATIONS

Chang, R.K.C., "Defending against flooding-based distributed denial-of-service attacks: a tutorial," Communications Magazine, IEEE, 2002, vol. 40, No. 10, pp. 42,51.

(Continued)

*Primary Examiner* — Jung Park
(74) *Attorney, Agent, or Firm* — Guntin & Gust, PLC; Jay H. Anderson

(57) ABSTRACT

A method that incorporates teachings of the subject disclosure may include, for example, obtaining data relating to a set of collision events on a shared channel on a wireless network according to a contention-based access protocol in which a plurality of terminals attempt to access the channel contemporaneously. A probability of collision in the channel is estimated and a probability distribution of time intervals between access attempts is generated based on the estimated probability of collision. Empirical and theoretical cumulative distribution functions for the time intervals are calculated, and compared to identify a malfunctioning terminal not operating in accordance with the protocol. Other embodiments are disclosed.

20 Claims, 11 Drawing Sheets

(56) References Cited

OTHER PUBLICATIONS

Mirkovic, , "D-WARD: source-end defense against distributed denial-of-service attacks," University of California, 2003.

Peng et al., "Survey of network-based defense mechanisms countering the DoS and DDoS problems," *ACM Computing Surveys (CSUR)*, 2007, vol. 39.1, pp. 3.

\* cited by examiner

200

700

800

DETECTION AND MITIGATION OF DENIAL-OF-SERVICE ATTACKS IN WIRELESS COMMUNICATION NETWORKS

FIELD OF THE DISCLOSURE

The subject disclosure relates to systems and methods for detecting and mitigating denial-of-service (DoS) attacks in wireless communication networks.

BACKGROUND

A Random Access Channel (RACH) is a control channel used by 3GPP-based wireless cellular networks, and is used by network subscribers to initiate various connections with the network. The RACH works under a contention-based access protocol and is shared by all users within a cell/sector.

BRIEF DESCRIPTION OF THE DRAWINGS

Reference will now be made to the accompanying drawings, which are not necessarily drawn to scale, and wherein.

DETAILED DESCRIPTION

Figure 1:
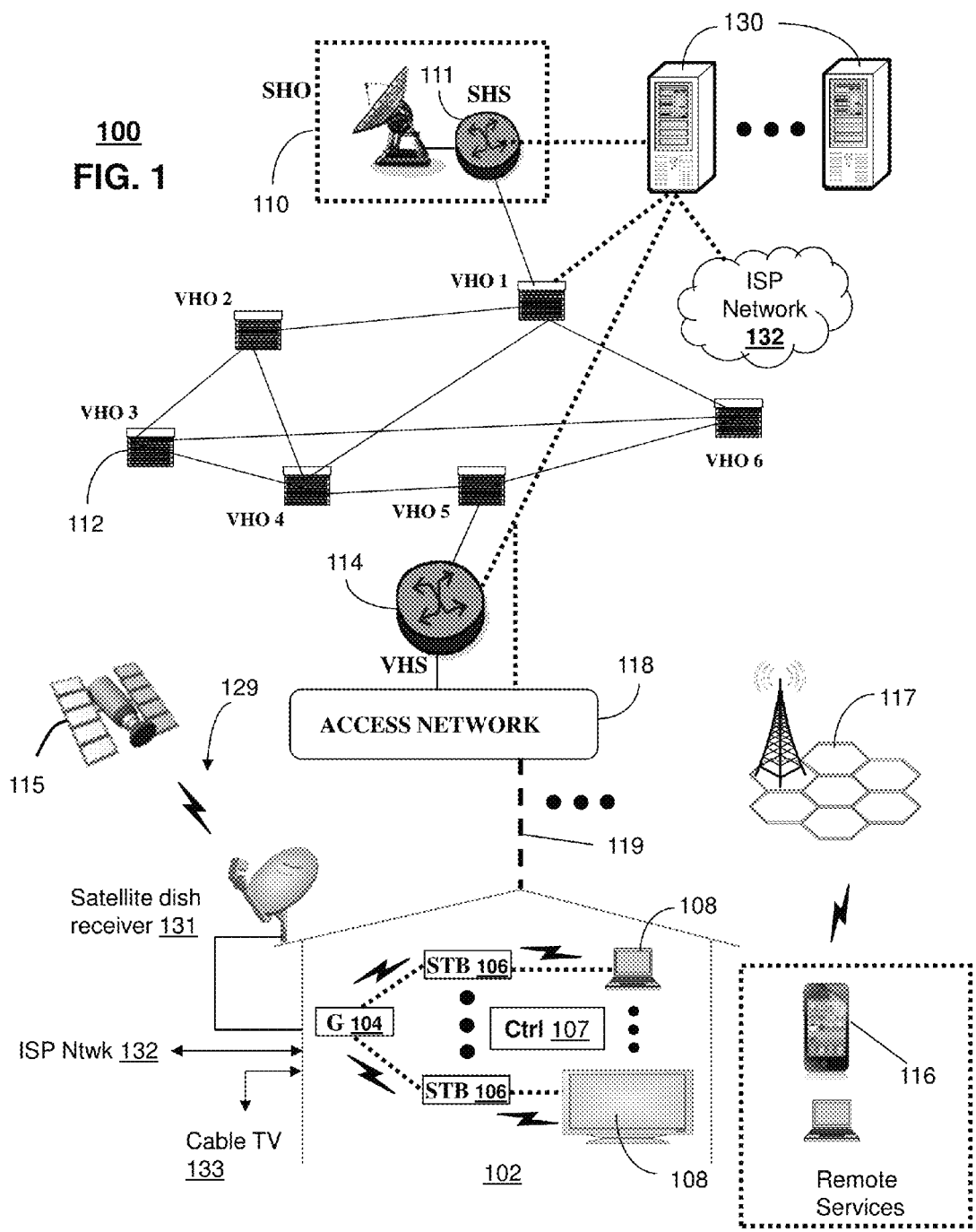
FIG. 1 depicts an illustrative embodiment of a communication system including a wireless communication network.

The subject disclosure describes, among other things, illustrative embodiments of methods for management of wireless cellular networks, and more specifically a method for detecting jamming and denial-of-service (DoS) attacks on a network. Other embodiments are contemplated by the subject disclosure.

One embodiment of the subject disclosure includes a method comprising obtaining data relating to a set of collision events on a shared channel for communicating with the base station on a wireless network according to a contention-based access protocol in which a plurality of terminals attempt to access the channel contemporaneously. In this embodiment, the data is obtained by a base station of a cellular network and the base station comprises a processor. The data comprises a first number representing a number of unsuccessful attempts to access the channel by the plurality of terminals, a second number representing a number of access attempts, and a set of time intervals between access attempts for each of the plurality of terminals, the channel being associated with a set of resource blocks. The method also comprises estimating, by the base station, a probability of collision in the channel based on the first number, the second number, and the protocol, and generating a first (theoretical) probability distribution of the time intervals for each of the terminals, based on the estimated probability of collision. The base station calculates a second (empirical) probability distribution of the time intervals for each of the terminals based on the data, and calculates for each terminal a first cumulative distribution function and a second cumulative distribution function from the first probability distribution and the second probability distribution respectively. The base station compares the first cumulative distribution function and the second cumulative distribution function for each terminal to identify a malfunctioning terminal not operating in accordance with the protocol. The method further comprises blocking an incoming signal from the malfunctioning terminal, responsive to determining that the base station is in a multi-antenna system and is capable of estimating an angle of arrival of the incoming signal. The method also comprises re-assigning the channel to a different set of resource blocks and broadcasting information regarding the re-assigning on a broadcast channel, responsive to determining that the base station is not in a multi-antenna system or is not capable of estimating an angle of arrival of a signal incoming to the base station from the malfunctioning terminal.

One embodiment of the subject disclosure includes a base station comprising a memory to store instructions and a processor coupled to the memory. The processor, responsive to executing the instructions, performs operations. The operations comprise obtaining data relating to a set of collision events on a shared channel for communicating with the base station on a wireless network according to a contention-based access protocol, wherein a plurality of terminals attempt to access the channel contemporaneously. The data comprise a first number representing a number of unsuccessful attempts to access the channel by the plurality of terminals, a second number representing a number of access attempts, and a set of time intervals between access attempts for each of the plurality of terminals, the channel being associated with a set of resource blocks. The operations also comprise estimating a probability of collision in the channel based on the first number, the second number, and the protocol, generating a first (theoretical) probability distribution of the time intervals for each of the terminals based on the estimated probability of collision, calculating a second (empirical) probability distribution of the time intervals for each of the terminals based on the data, calculating for each terminal a first cumulative distribution function and a second cumulative distribution function from the first probability distribution and the second probability distribution respectively, generating a test statistic based on the first cumulative distribution function and the second cumulative distribution function for each terminal, and applying a one-sided statistical goodness of fit test to the test statistic to determine a goodness of fit threshold function. The operations further comprise comparing the second (empirical) cumulative distribution function and the goodness of fit threshold function for each terminal to identify a malfunctioning terminal not operating in accordance with the protocol, where for some time interval in the set of time intervals, the malfunctioning terminal has a second (empirical) cumulative distribution function value that exceeds the threshold function. The operations further comprise blocking a signal from the malfunctioning terminal, responsive to determining that the base station is in a multi-antenna system and is capable of estimating an angle of arrival of a signal incoming to the base station from the malfunctioning terminal, and re-assigning the channel to a different set of resource blocks and broadcasting information regarding the re-assigning on a broadcast channel, responsive to determining that the base station is not in a multi-antenna system or is not capable of estimating an angle of arrival of a signal incoming to the base station from the malfunctioning terminal.

One embodiment of the subject disclosure includes a non-transitory computer-readable storage device comprising executable instructions which, when executed by a processor, cause the processor to perform operations. The operations comprise obtaining data relating to a set of collision events on a shared channel for communicating with a base station on a wireless network according to a contention-based access protocol, wherein a plurality of terminals attempt to access the channel contemporaneously, the data comprising a first number representing a number of unsuccessful attempts to access the channel by the plurality of terminals, a second number representing a number of access attempts, and a set of time intervals between access attempts for each of the plurality of terminals, the channel being associated with a set of resource blocks. The operations also comprise estimating a probability of collision in the channel based on the first number, the second number, and the protocol, generating a first (theoretical) probability distribution of the time intervals for each of the terminals based on the estimated probability of collision, calculating a second (empirical) probability distribution of the time intervals for each of the terminals based on the data, and calculating for each terminal a first cumulative distribution function and a second cumulative distribution function from the first probability distribution and the second probability distribution respectively. The operations further comprise generating a test statistic based on the first cumulative distribution function and the second cumulative distribution function for each terminal, applying a one-sided statistical goodness of fit test to the test statistic to determine a goodness of fit threshold function, and comparing the second cumulative distribution function and the goodness of fit threshold function for each terminal to identify a malfunctioning terminal not operating in accordance with the protocol, wherein for some time interval in the set of time intervals, the malfunctioning terminal has a second cumulative distribution function value that exceeds the threshold function. The operations also comprise blocking an incoming signal from the malfunctioning terminal responsive to determining that the base station is in a multi-antenna system and is capable of estimating an angle of arrival of the incoming signal, and re-assigning the channel to a different set of resource blocks and broadcasting information regarding the re-assigning on a broadcast channel, responsive to determining that the base station is not in a multi-antenna system or is not capable of estimating an angle of arrival of a signal incoming to the base station from the malfunctioning terminal.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used in the media system of FIG. 1. The satellite broadcast television system can be overlaid, operably coupled with, or replace the IPTV system as another representative embodiment of communication system 100. In this embodiment, signals transmitted by a satellite 115 that include media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to an Internet Service Provider (ISP) network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over the ISP network 132 to wireline media devices 108 or wireless communication devices 116. In particular, computing devices 130 can function as servers supporting a communication network such as a cellular network including wireless access base station 117. Media services can be offered to communication devices 116 by way of wireless access base station 117 operating according to wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. As shown schematically in FIG. 1, wireless communication device 116 can transmit data (voice, text, etc.) to base station 117. The communication device accesses the base station according to a communication protocol that defines a random access channel (RACH), discussed in more detail below.

Additionally, It is further contemplated that multiple forms of media services can be offered to media devices over landline technologies such as those described above. Other present and next generation wide area wireless access network technologies are contemplated by the subject disclosure.

Figure 2:
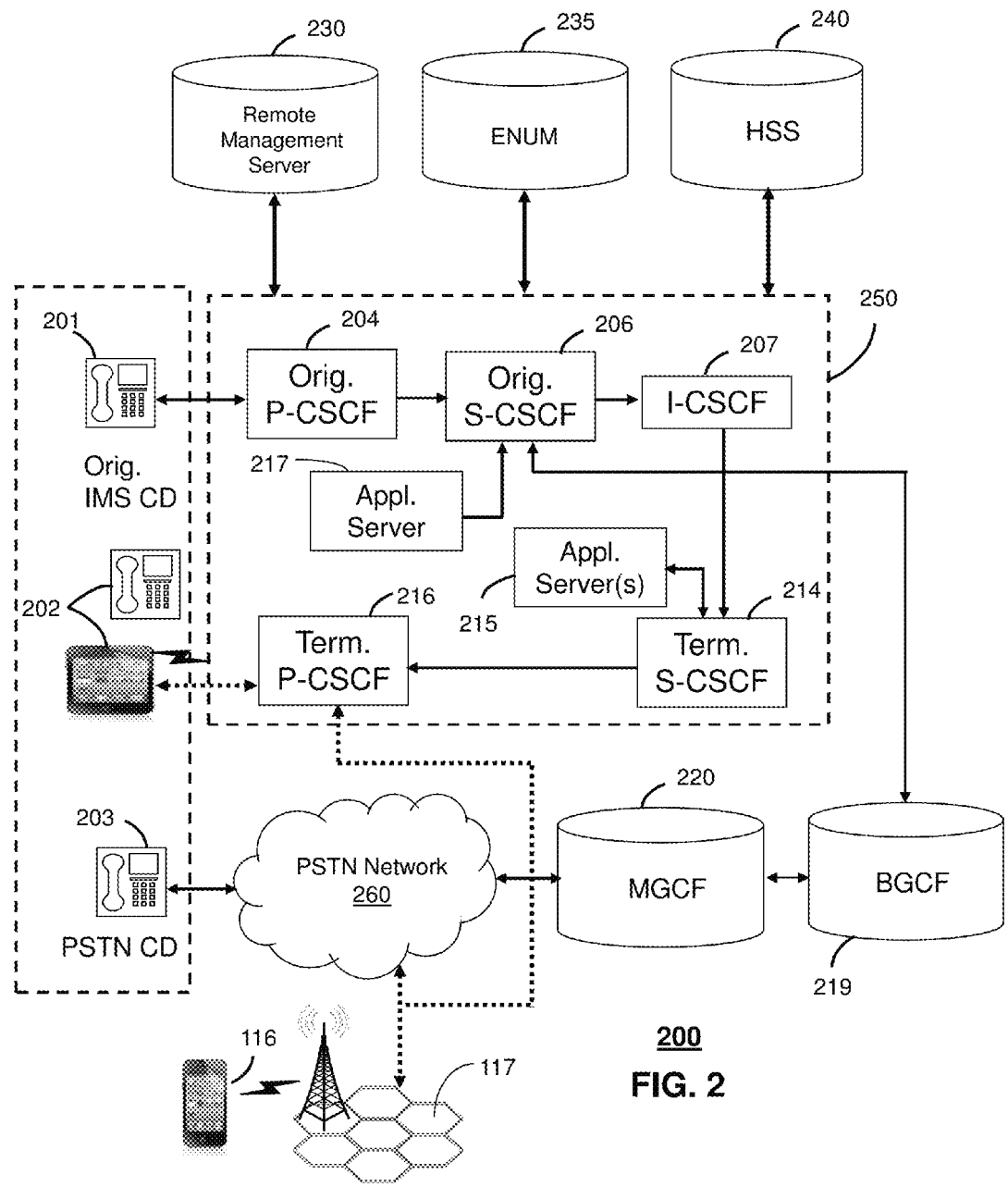
FIG. 2 depicts an illustrative embodiment of a communication system including telephone networks.

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 117, a femtocell, a WiFi router, a Digital Enhanced Cordless Telecommunications (DECT) base unit, or another suitable wireless access unit to establish communications with the IMS network 250 of FIG. 2. As noted above, cellular access base station 117 can operate according to common wireless access protocols such as GSM, CDMA, TDMA, UMTS, WiMax, SDR, LTE, and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 117 may communicate directly with the IMS network 250 as shown by the arrow connecting the cellular base station 117 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server(s) 130 of FIG. 1 can be operably coupled to the second communication system 200 for purposes similar to those described above.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

As shown in FIG. 2, cellular base station 117 is connected to network 260, and communicates wirelessly with mobile terminal 116. Base station 117 operates according to a wireless access protocol such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. As shown schematically in FIG. 2, wireless communication device 116 can transmit data (voice, text, etc.) to base station 117. The communication device accesses the base station according to a communication protocol that defines a random access channel (RACH), discussed in more detail below.

In order to manage multiple simultaneous connections, the system allocates resources to each phone and follows a particular multiple access method. The simplest of these methods is the combination of FDMA (Frequency Division Multiple Access) and TDMA (Time Division Multiple Access) utilized in GSM networks. In this case, an incoming call is assigned resources in the form of a time slot within a frequency channel. This way, each individual user is allocated to a different time slot and/or subcarrier out of the 125 channels with 8 slots available. Note that some of the time slots in a specific frequency are reserved for system control and broadcast messages. This is common for all the standards described in this section.

FDMA/TDMA systems, originally designed for voice traffic, provide bandwidth for data connections by aggregating multiple time slots and frequency channels and combining them.

In the case of UMTS, the WCDMA-based (Wideband Code Division Multiple Access) multiple access methods, capacity is assigned as a combination of a code and a power level. Despite being all the transmission simultaneous and on the same frequency channel, individual users and channels are distinguished by means of a combination of orthogonal codes (Walsch codes) and quasi-orthogonal codes. Note that, in the case of 3G and beyond, the RRC engine can adapt the amount of resources allocated (in this case, the power level) according to the requested QoS and current channel conditions.

Finally, LTE divides the resources in a grid of time and frequency slots and allocates multiple resource blocks according to the requested QoS and channel conditions. This multiple access method is known as Orthogonal Frequency-Division Multiple Access (OFDMA) and is based in Orthogonal Frequency-Division Multiplexing (OFDM).

Once the phone has been given access to the network and granted radio resources by the RRC engine, further steps in the MAC protocol establish an end-to-end connection between the mobile terminal and the appropriate switching node in the core network.

Figure 3:
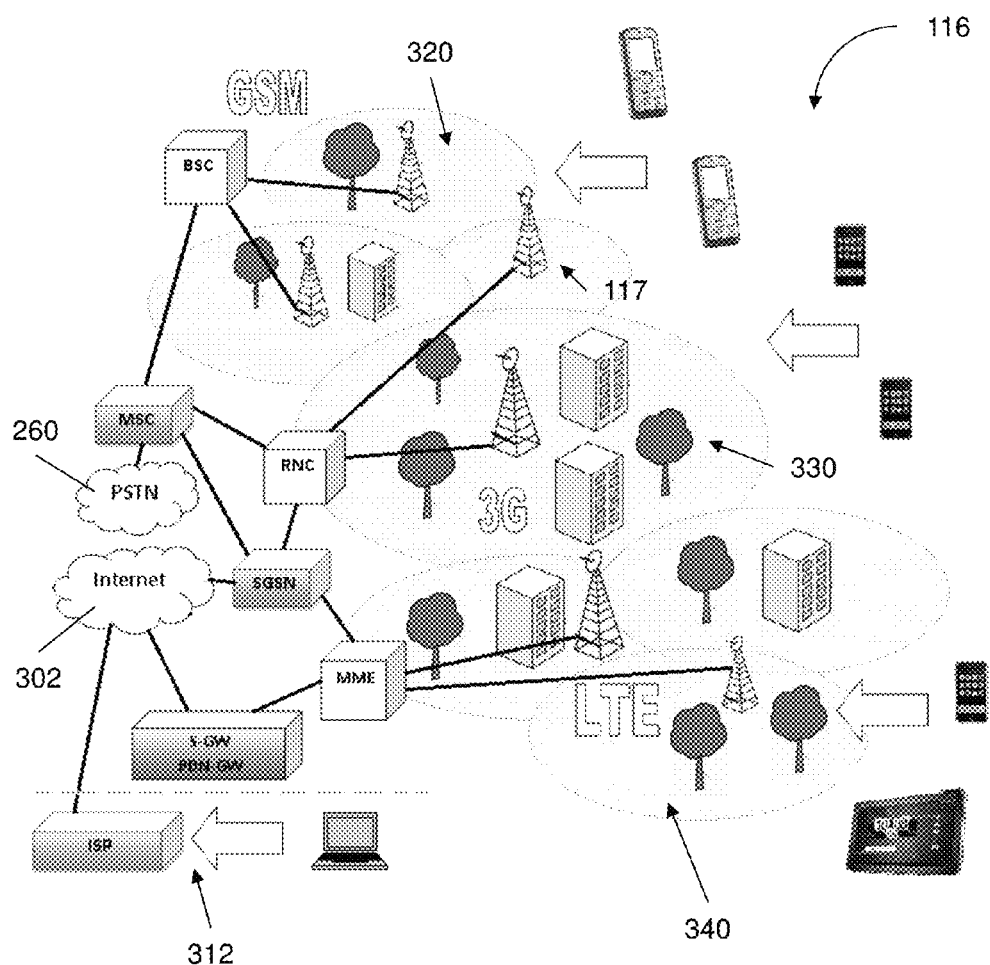
FIG. 3 depicts an illustrative embodiment of an architecture for a cellular network for interacting with mobile communication devices.

FIG. 3 schematically illustrates an architecture 300 for a cellular network. Mobile devices 116 with a variety of technologies (phones, tablets, etc.) have an end-to-end connection established with either the Public Switched Telephone Network (PSTN) 260, in the case of voice traffic, or an internet protocol network (Internet) 302, in the case of data traffic. The architecture can include a GSM network 320, a 3G network 330, and/or an LTE network 340. In particular, LTE specifications define an all-internet protocol architecture with voice over internet protocol (VoIP). FIG. 3 also illustrates a device accessing the network through an Internet Service Provider (ISP) broadband connection 312.

It will be appreciated that a network with architecture as shown in FIG. 3 can encounter a problem when it is required to assign resources to multiple users that are trying to connect contemporaneously with a base station 117 on a given network.

Figure 4:
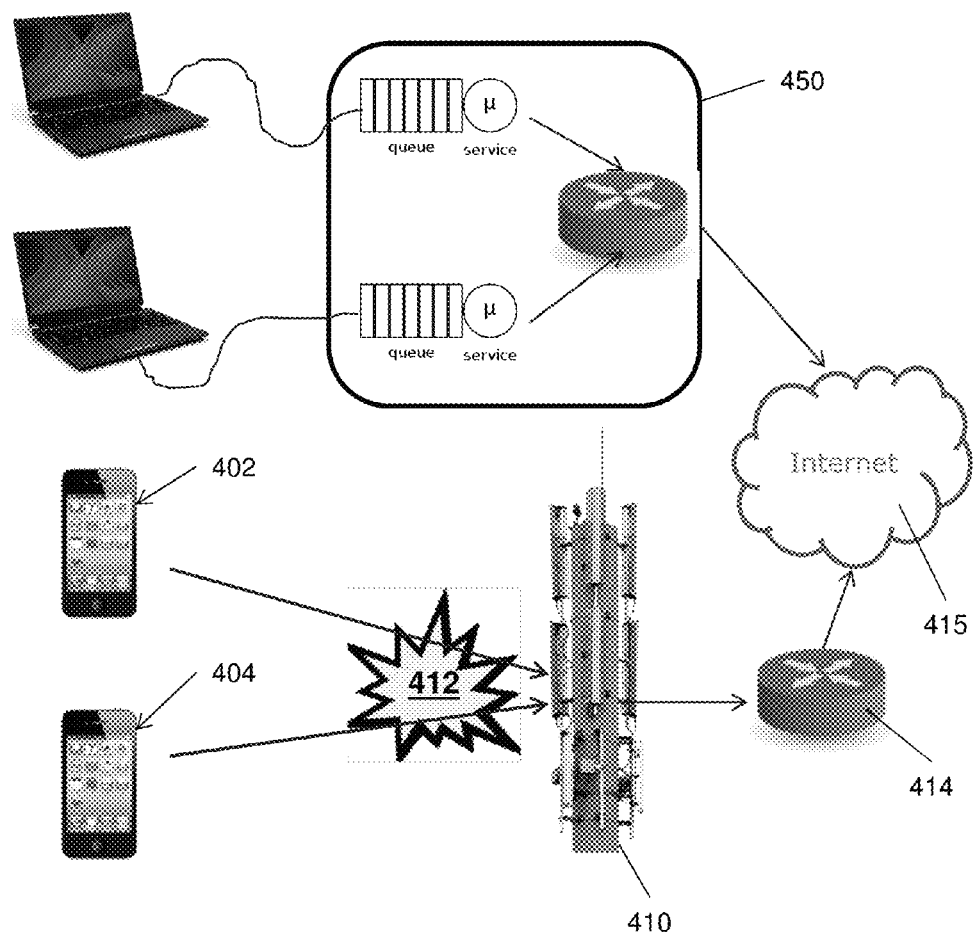
FIG. 4 schematically illustrates collisions between messages from different mobile terminals in a random access channel of a communication system.

The Random Access Channel (RACH) is a control channel used by 3GPP-based wireless cellular networks generally (GSM, UMTS, LTE, A-LTE, etc.). This channel is used to initiate various connections with the network (voice, SMS and IP) and to maintain synchronization in the UL. The RACH works under a contention-based access protocol and is shared by all users within a cell/sector. When users send messages on this channel, collisions (data packets arriving contemporaneously from different terminal devices) can occur. In case of a collision, a user waits for a random period of time (the "back-off" interval) and then attempts a new transmission. FIG. 4 schematically illustrates a situation 400 where two mobile terminals 402, 404 attempt to initiate communication (e.g. send a preamble message) to base station 410. A collision 412 results in each terminal waiting for a period of time (back-off interval) before sending its packet again. The random back-off interval is typically different for each terminal and at each occurrence, and has a duration of a random number of RACH time frames, each frame, for example, typically being 20 ms in the case of UMTS and 10 ms in LTE. The base station sends the terminals a negative acknowledgement (NACK) when a collision occurs; accordingly, the base station accumulates data over a convenient period of time (e.g. a specified number of RACH frames) on how many access attempts were made and how many collisions occurred. In the absence of a collision, the base station returns an acknowledgement (ACK) message to the terminal and a connection is established with the base station and the network. User data then can be forwarded to server 414 and thence to internet 415. As shown in FIG. 4, wired terminals by contrast transmit messages using a queuing scheme 450 so that collisions do not occur.

The shared and contention-based nature of the RACH channel makes it vulnerable to attack. Specifically, a wireless device that maliciously floods the channel with packets and thus forces all legitimate packets to collide will generate a Denial of Service (DoS) situation. Legitimate users will then be unable to access the network (users on an ongoing voice call will not notice the attack unless they attempt to establish a new connection). This kind of jamming, referred to herein as "smart jamming", is unlike traditional forms of radio jamming in that the required transmission power is very low—the transmission power of a regular cellphone will suffice.

Accordingly, smart jamming is more difficult to detect. To a network operator it will appear that there is a high load in a cell, where many users are attempting to access the network at the same time.

If a cellular device is tampered with, so that it does not operate according to the RACH protocol, a user of that device can obtain a better access to the network (e.g. in terms of call set up delay, connection speed and bandwidth) than other users. This represents a Theft of Service attack, since the user obtains network services at the expense of the other (legitimate) users.

Figure 5:
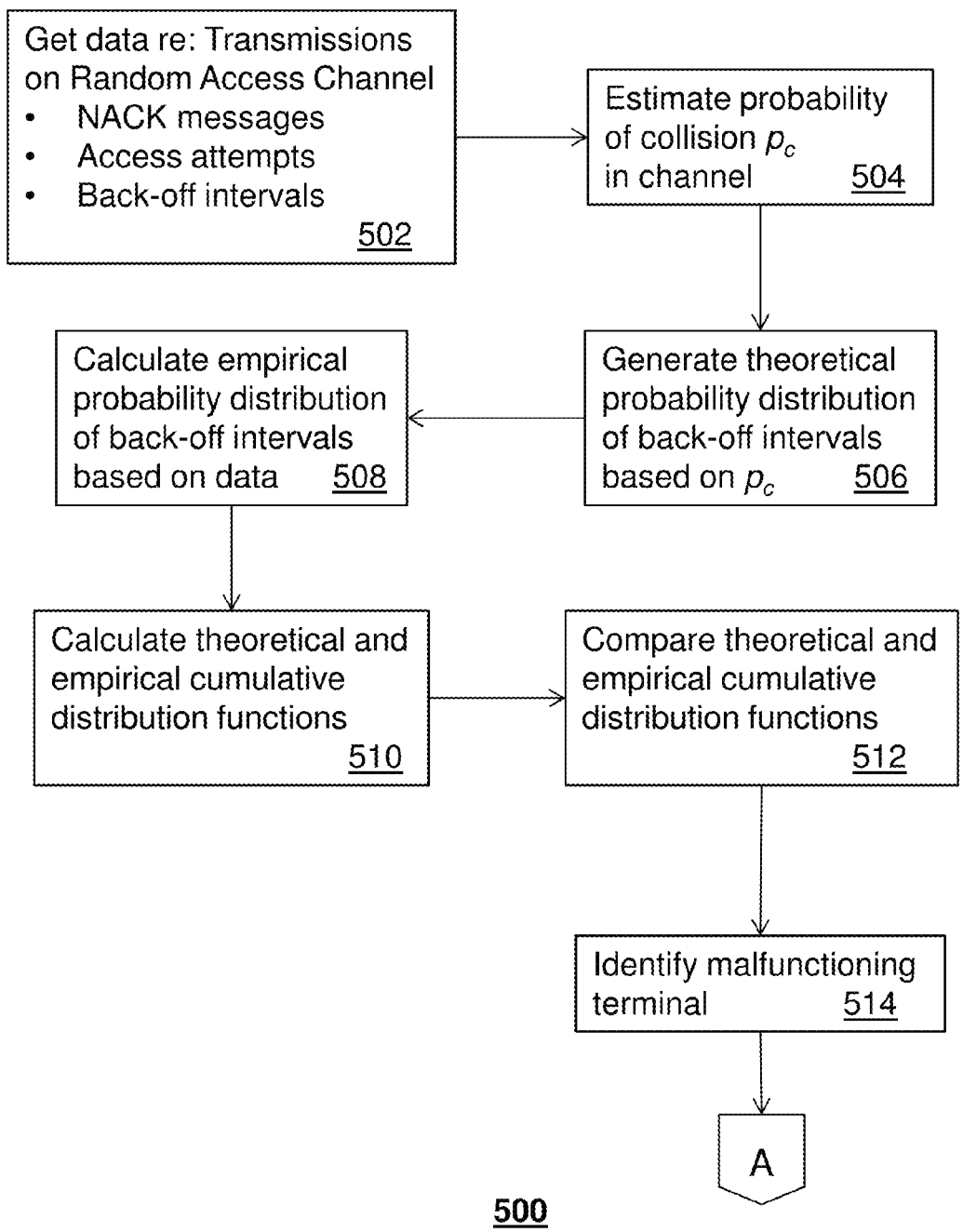
FIG. 5 is a flowchart illustrating a procedure for identifying a malfunctioning terminal on a random access channel.

FIG. 5 shows a flowchart illustrating a procedure 500 for detecting an attack on the RACH, in accordance with an embodiment of the disclosure. This procedure can be implemented at the base station, and accordingly permits real-time detection of an attack. In step 502, data is obtained regarding the number of access attempts, the number of collisions, and the back-off intervals (the time between consecutive access attempts by each user). In this embodiment, each preamble message sent from the mobile terminals includes a unique identifier. The base station, upon reception of a preamble, can identify the device from which it originated. The base station also has available an arrival time stamp of each preamble. Therefore, combining these time stamps and the unique identifiers, the base station can compute the inter-arrival times of the preamble messages.

In step 504, the base station estimates the probability of collision in the channel. In an embodiment, to estimate the probability of collision the base station divides the number of unsuccessful attempts by a given user terminal to access the RACH by the total number of access attempts. The probability of collision $p_c$ is used to generate a theoretical probability distribution of the back-off intervals (step 506), based on the protocol specification of the RACH.

In this embodiment, $x_1, \ldots x_k$ represent a sequence of k observations of back-off intervals for a given user, and the theoretical probability distribution $f_0$ for a legitimate user, according to the RACH protocol specification for the UMTS ASC-0 QoS class, is given by $f_0(x_i) = U[0,4]$ with probability $(1-P_c)$ $U[0,4] + U[0,4]$ with probability $(1-p_c)p_c$ $U[0,4] + U[0,4] + U[0,4]$ with probability $(1-p_c)p_c^2$

...

where $p_c$ is the probability of collision in the channel, $U[0, 4]$ is the uniform distribution, and $f_0$ is expressed as a number of 20 ms RACH frames.

In step 508, an empirical probability distribution $f_1$ of the user's back-off intervals is calculated, based on the data (in this example, the k observations of the back-off intervals). The cumulative distribution functions (CDF) $F_0(x)$ and $F_1(x)$ for the back-off intervals, corresponding to the probability distribution functions $f_0$ and $f_1$ respectively, are then calculated (step 510). The cumulative distribution functions are then compared (step 512). For a user terminal operating in accordance with the protocol, $F_1(x) \leq F_0(x)$ for all x. However, due to the probabilistic nature of the Random Access Channel protocol and artifacts of the wireless channel, some values of $F_1(x)$ can be slightly above $F_0(x)$.

In order to identify a malfunctioning user terminal (that is, a terminal not operating in accordance with the RACH protocol), a malfunctioning terminal is defined as a terminal where for some x, $F_1(x) > F_0(x) + T$, where T is a threshold value.

In an embodiment, a one-sided statistical goodness-of-fit test (Kolmogorov-Smirnov test) is used to determine whether a particular user terminal is a malfunctioning terminal. To apply this test, a null hypothesis $H_0$: $F_1 \leq F_0$ is made to correspond to a legitimate terminal, while alternate hypothesis $H_1$: $F_1 > F_0$ corresponds to a malfunctioning terminal A Kolmogorov-Smirnov test statistic is defined as $D = \sup|F_1(x) - F_0(x)|$. The null hypothesis is rejected if this statistic is greater than a critical value for a given significance level, indicating a malfunctioning terminal. By using the goodness of fit test, a malfunctioning terminal (the source of the attack) can be identified, even if the attack strategy is unknown.

Figure 6:
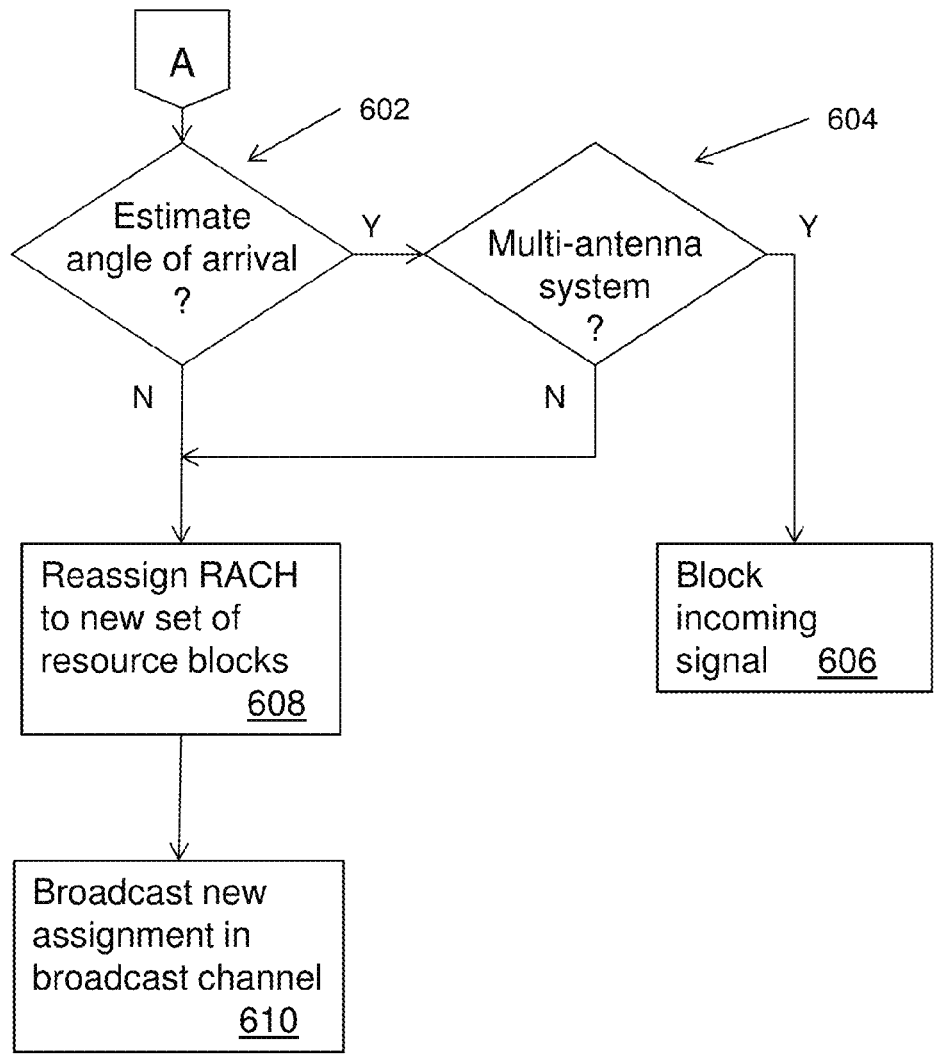
FIG. 6 is a flowchart illustrating a procedure for mitigating the effect of the malfunctioning terminal identified in the procedure of FIG. 5.

FIG. 6 shows a flowchart illustrating a procedure 600 for mitigating the effect of a malfunctioning terminal identified in procedure 500, according to an embodiment of the disclosure. If the base station is capable of estimating the angle of arrival of the jamming signal (step 602), and the base station is a multi-antenna system (step 604), then the incoming (jamming) signal from that direction can be blocked (step 606). Otherwise, the random access channel can be re-assigned to a new set of resource blocks (step 608). The new assignment of the RACH is then broadcast, in the broadcast channel of the network (step 610).

Figure 7:
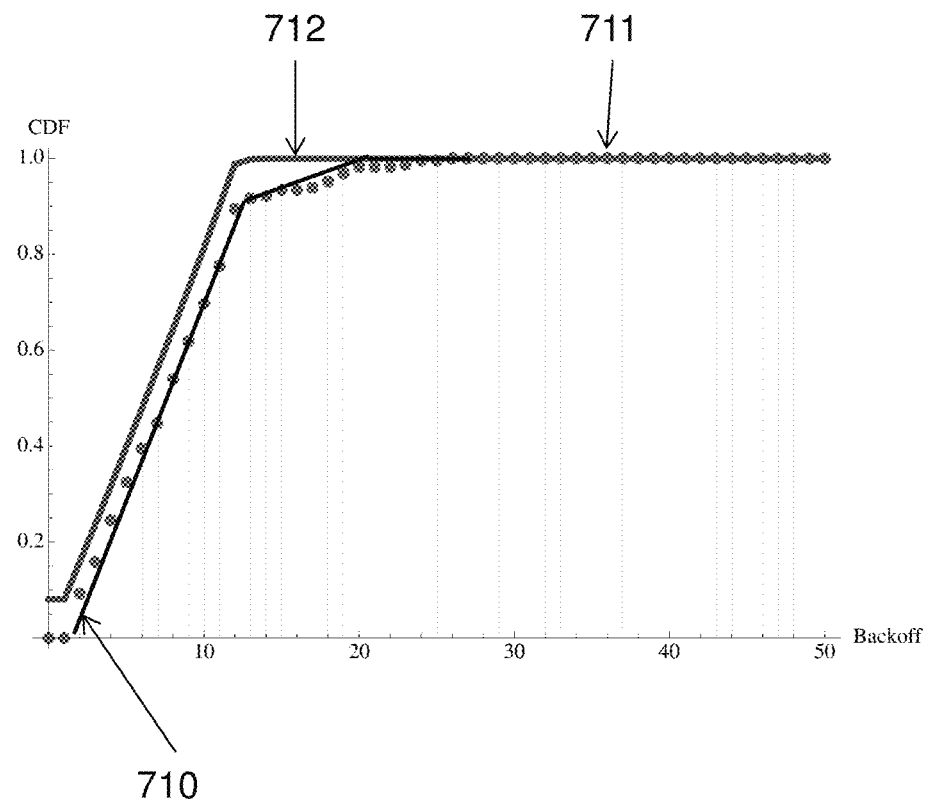
FIG. 7 shows a plot of cumulative distribution function of back-off intervals for a terminal functioning legitimately according to the access protocol of a random access channel.

FIG. 7 shows a plot 700 of the cumulative distribution function of back-off intervals for a terminal functioning legitimately according to the access protocol of a random access channel. In the plot of FIG. 7, the theoretical cumulative distribution function $F_0$ and empirical cumulative distribution function $F_1$ are shown as solid line 710 and dotted line 711 respectively. Solid line 712 represents the threshold for the goodness of fit test. The terminal of plot 700 meets the criterion $F_1(x) \leq F_0(x)$ for all x and accordingly is functioning legitimately.

Figure 8:
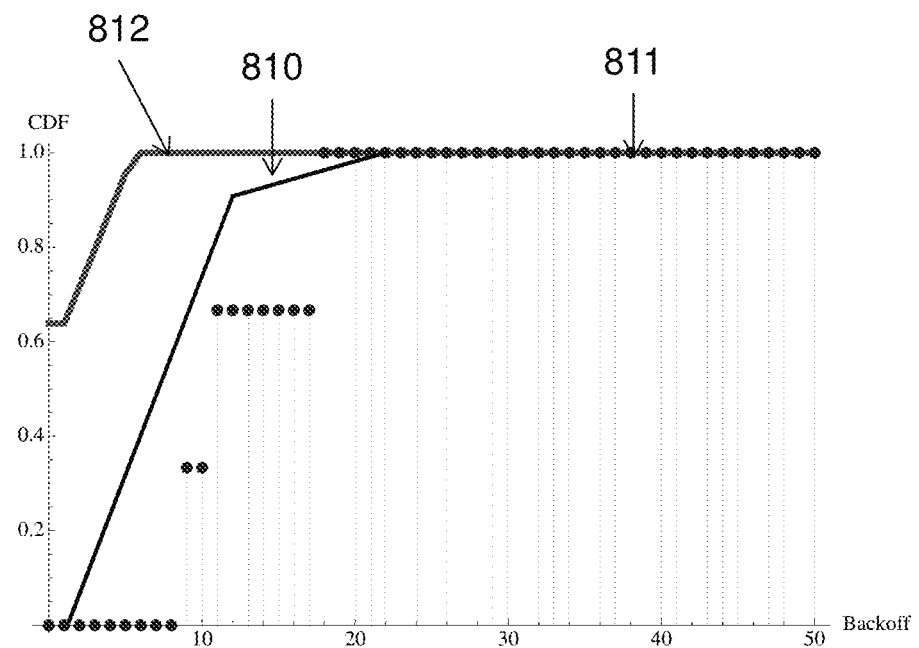
FIG. 8 shows a plot of cumulative distribution function of back-off intervals for another terminal functioning legitimately according to the access protocol of a random access channel.

FIG. 8 shows a plot 800 of cumulative distribution function of back-off intervals for another legitimately functioning terminal. In the plot of FIG. 8, the theoretical cumulative distribution function $F_0$ and empirical cumulative distribution function $F_1$ are shown as solid line 810 and dotted line 811 respectively. Solid line 812 represents the threshold for the goodness of fit test. The Kolmogorov-Smirnov goodness of fit test offers flexibility to eventual variations of a legitimate user's transmission behavior away from the expected CDF $F_0(x)$. FIG. 8 shows an example of a legitimate user that, due to the probabilistic nature of the Random Access Channel protocol and the wireless channel, has certain values of $F_1(x)$ above $F_0(x)$.

Figure 9:
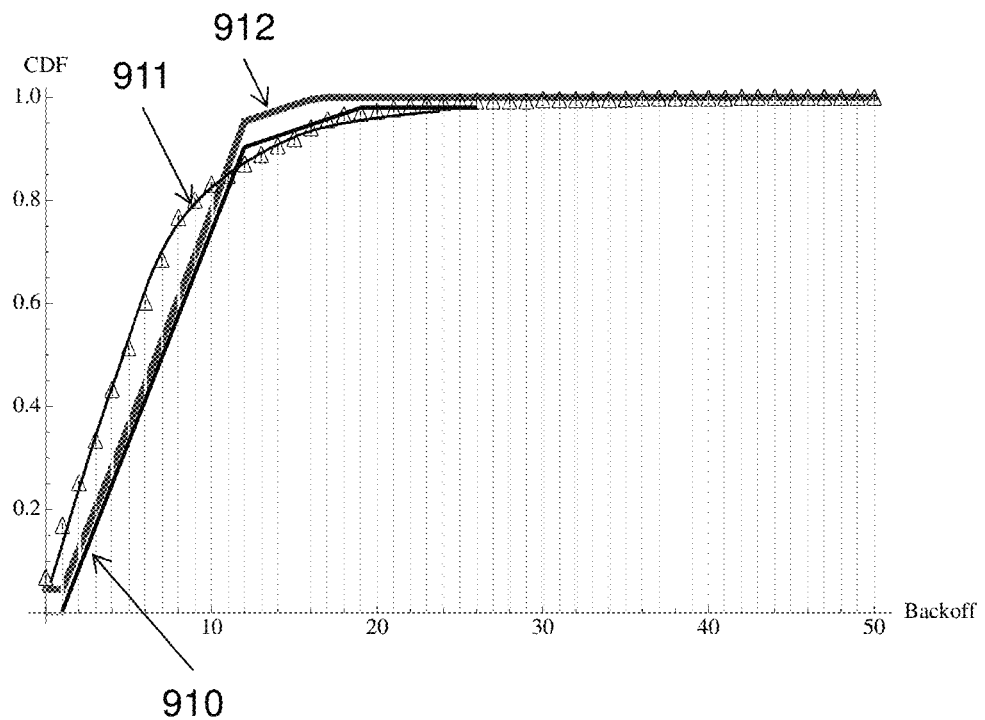
FIG. 9 shows a plot of cumulative distribution function of back-off intervals for a malfunctioning terminal not operating according to the access protocol of a random access channel.

FIG. 9 shows a plot 900 of cumulative distribution function of back-off intervals for a malfunctioning terminal not operating according to the access protocol of a random access channel. In the plot of FIG. 9, the theoretical cumulative distribution function $F_0$ and empirical cumulative distribution function $F_1$ are shown as solid line 910 and dotted line 911 respectively. Solid line 912 represents the threshold for the goodness of fit test. There are numerous values in the empirical CDF plot 911 that exceed the threshold plot 912, indicating that the behavior of the user terminal does not meet the goodness-of-fit criterion.

Figure 10:
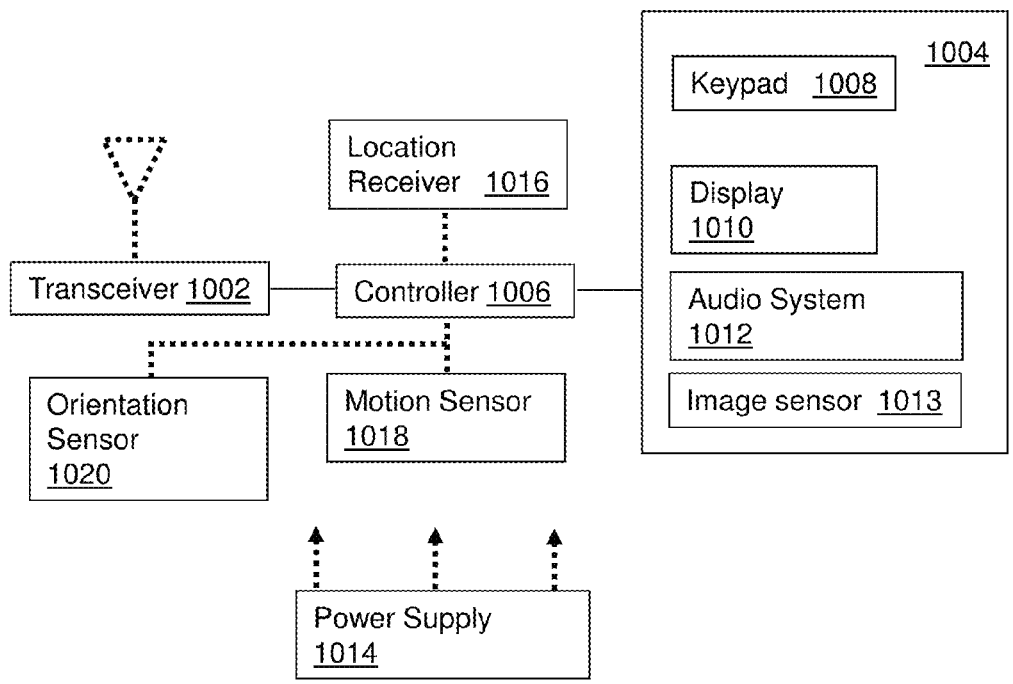
FIG. 10 depicts an illustrative embodiment of a communication device.

FIG. 10 depicts an illustrative embodiment of a communication device 1000. Communication device 1000 can serve in whole or in part as an illustrative embodiment of the mobile terminal devices depicted in FIGS. 1-4. The communication device 1000 can comprise a wireline and/or wireless transceiver 1002 (herein transceiver 1002), a user interface (UI) 1004, a power supply 1014, a location receiver 1016, a motion sensor 1018, an orientation sensor 420, and a controller 1006 for managing operations thereof. The transceiver 1002 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input (e.g., touch of a user's finger). As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements. The display 110 can be an integral part of the housing assembly of the communication device 100 or an independent device communicatively coupled thereto by a tethered wireline interface (such as a cable) or a wireless interface.

The UI 1004 can also include an audio system 1012 that utilizes common audio technology for conveying low volume audio (such as audio heard only in the proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, the charging system can utilize external power sources such as DC power supplied over a physical interface such as a USB port or other suitable tethering technologies.

The location receiver 1016 can utilize common location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 420 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 1006 can utilize computing technologies such as a microprocessor, a digital signal processor (DSP), and/or a video processor with associated storage memory such as Flash, ROM, RAM, SRAM, DRAM or other storage technologies for executing computer instructions, controlling and processing data supplied by the aforementioned components of the communication device 100.

Other components not shown in FIG. 10 are contemplated by the subject disclosure. For instance, the communication device 1000 can include a reset button (not shown). The reset button can be used to reset the controller 1006 of the communication device 1000. In yet another embodiment, the communication device 1000 can also include a factory default setting button positioned below a small hole in a housing assembly of the communication device 1000 to force the communication device 1000 to re-establish factory settings. In this embodiment, a user can use a protruding object such as a pen or paper clip tip to reach into the hole and depress the default setting button.

The communication device 1000 as described herein can operate with more or less components described in FIG. 10 as depicted by the hash lines. These variant embodiments are contemplated by the subject disclosure.

The communication device 1000 can be adapted to perform the functions of the media processor 106, the media devices 108, or the portable communication devices 116 of FIG. 1, as well as the IMS CDs 201-202 and PSTN CDs 203 of FIG. 2. It will be appreciated that the communication device 1000 can also represent other devices that can operate in communication systems 100-200 of FIGS. 1-2 such as a gaming console and a media player.

It is contemplated by the subject disclosure that the communication device 1000 shown in FIG. 10 or portions thereof can serve as a representation of one or more of the devices of communication systems 100-200. Specifically, it is contemplated that communication device 1000 can function as a wireless device that accesses a base station of a cellular network via a random access channel (RACH) of the network.

Upon reviewing the aforementioned embodiments, it would be evident to an artisan with ordinary skill in the art that said embodiments can be modified, reduced, or enhanced without departing from the scope and spirit of the claims described below. Other embodiments are contemplated by the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
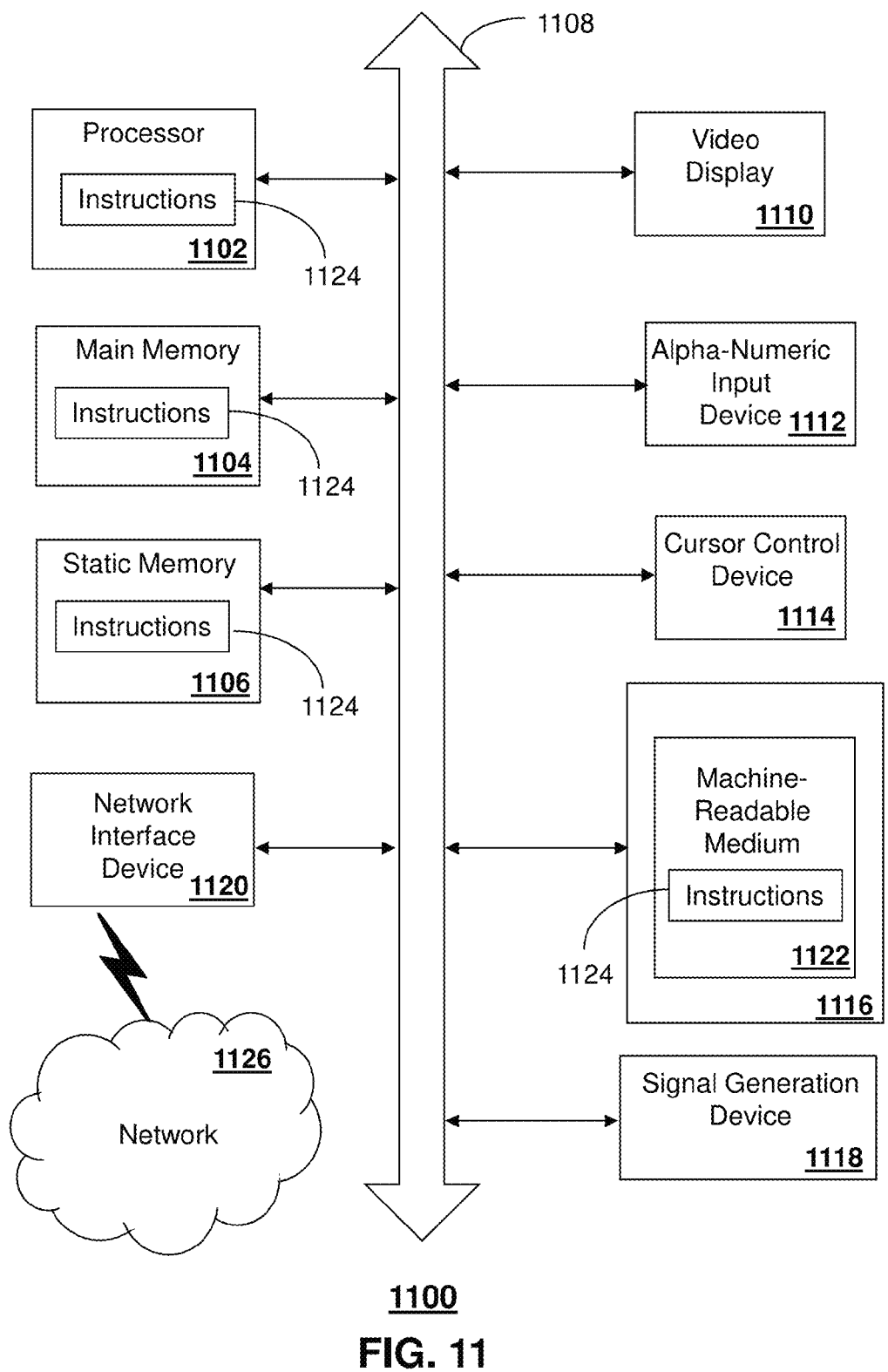
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods discussed above. One or more instances of the machine can operate, for example, as the server 130, base station 117, or other devices of FIGS. 1-4. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, or a solid state display. The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 720.

The disk drive unit 1116 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
obtaining, by a base station comprising a processor, data relating to a set of collision events on a shared channel for communicating with the base station on a wireless network according to a contention-based access protocol,
wherein a plurality of terminals attempt to access the channel contemporaneously, the data comprising a first number representing a number of unsuccessful attempts to access the channel by the plurality of terminals, a second number representing a number of access attempts, and a set of time intervals between access attempts for each of the plurality of terminals, the channel being associated with a set of resource blocks;
estimating, by the base station, a probability of collision in the channel based on the first number, the second number, and the protocol;
generating, by the base station, a first probability distribution of the time intervals for each of the terminals, based on the estimated probability of collision;
calculating, by the base station, a second probability distribution of the time intervals for each of the terminals, based on the data;
calculating, by the base station, for each terminal a first cumulative distribution function and a second cumulative distribution function from the first probability distribution and the second probability distribution respectively;
comparing, by the base station, the first cumulative distribution function and the second cumulative distribution function for each terminal to identify a malfunctioning terminal not operating in accordance with the protocol;
responsive to determining that the base station is in a multi-antenna system and is capable of estimating an angle of arrival of a signal incoming to the base station from the malfunctioning terminal, blocking the signal from the malfunctioning terminal; and
responsive to determining that the base station is not in a multi-antenna system or is not capable of estimating an angle of arrival of a signal incoming to the base station from the malfunctioning terminal, re-assigning the channel to a different set of resource blocks and broadcasting information regarding the re-assigning on a broadcast channel.

2. The method of claim 1, wherein the comparing step further comprises generating a test statistic based on the first cumulative distribution function and the second cumulative distribution function for each terminal, and applying a one-sided statistical goodness of fit test to the test statistic to determine a goodness of fit threshold function.

3. The method of claim 2, wherein for some time interval in the set of time intervals, the malfunctioning terminal has a second cumulative distribution function value that exceeds the threshold function.

4. The method of claim 1, wherein the comparing step further comprises determining that a given terminal is operating in accordance with the protocol, based on a determination that the second cumulative distribution function is less than or equal to the first cumulative distribution function for the terminal.

5. The method of claim 2, wherein the comparing step further comprises comparing the second cumulative distribution function and the threshold function for each terminal, and determining that a given terminal is operating in accordance with the protocol, based on a determination that the second cumulative distribution function is less than or equal to the threshold function for the terminal.

6. The method of claim 1, wherein an attempt to access the channel comprises transmission of a preamble message by a sending terminal of the plurality of terminals.

7. The method of claim 6, further comprising identifying the sending terminal based on an identifier included in the preamble message.

8. The method of claim 6, wherein the data further comprise an arrival time stamp of the preamble message, and further comprising computing, by the base station, a time interval between access attempts based on the arrival time stamp of the preamble message and an arrival time stamp of a subsequent preamble message.

9. The method of claim 1, wherein the malfunctioning terminal is identified as a source of a denial-of-service attack without information regarding a strategy for the attack.

10. A base station comprising:
a memory to store instructions; and
a processor coupled to the memory, wherein responsive to executing the instructions, the processor performs operations comprising:
obtaining data relating to a set of collision events on a shared channel for communicating with the base station on a wireless network according to a contention-based access protocol,
wherein a plurality of terminals attempt to access the channel contemporaneously, the data comprising a first number representing a number of unsuccessful attempts to access the channel by the plurality of terminals, a second number representing a number of access attempts, and a set of time intervals between access attempts for each of the plurality of terminals, the channel being associated with a set of resource blocks;
estimating a probability of collision in the channel based on the first number, the second number, and the protocol;
generating a first probability distribution of the time intervals for each of the terminals, based on the estimated probability of collision;
calculating a second probability distribution of the time intervals for each of the terminals;
calculating for each terminal a first cumulative distribution function and a second cumulative distribution function from the first probability distribution and the second probability distribution respectively;
generating a test statistic based on the first cumulative distribution function and the second cumulative distribution function for each terminal;
applying a one-sided statistical goodness of fit test to the test statistic to determine a goodness of fit threshold function;
comparing the second cumulative distribution function and the goodness of fit threshold function for each terminal to identify a malfunctioning terminal not operating in accordance with the protocol, wherein for some time interval in the set of time intervals, the malfunctioning terminal has a second cumulative distribution function value that exceeds the threshold function;

responsive to determining that the base station is in a multi-antenna system and is capable of estimating an angle of arrival of a signal incoming to the base station from the malfunctioning terminal, blocking the signal from the malfunctioning terminal; and responsive to determining that the base station is not in a multi-antenna system or is not capable of estimating an angle of arrival of a signal incoming to the base station from the malfunctioning terminal, re-assigning the channel to a different set of resource blocks and broadcasting information regarding the re-assigning on a broadcast channel.

11. The base station of claim 10, wherein the operations further comprise determining that a given terminal is operating in accordance with the protocol, based on a determination that the second cumulative distribution function is less than or equal to the first cumulative distribution function for the terminal.

12. The base station of claim 10, wherein the operations further comprise comparing the second cumulative distribution function and the threshold function for each terminal, and determining that a given terminal is operating in accordance with the protocol, based on a determination that the second cumulative distribution function is less than or equal to the threshold function for the terminal.

13. The base station of claim 10, wherein an attempt to access the channel comprises transmission of a preamble message by a sending terminal of the plurality of terminals.

14. The base station of claim 13, wherein the operations further comprise identifying the sending terminal based on an identifier included in the preamble message.

15. The base station of claim 13, wherein the data further comprise an arrival time stamp of the preamble message, and wherein the operations further comprise computing a time interval between access attempts based on the arrival time stamp of the preamble message and an arrival time stamp of a subsequent preamble message.

16. A non-transitory computer-readable storage device comprising executable instructions which, when executed by a processor, cause the processor to perform operations comprising:

obtaining data relating to a set of collision events on a shared channel for communicating with a base station on a wireless network according to a contention-based access protocol, wherein a plurality of terminals attempt to access the channel contemporaneously, the data comprising a first number representing a number of unsuccessful attempts to access the channel by the plurality of terminals, a second number representing a number of access attempts, and a set of time intervals between access attempts for each of the plurality of terminals, the channel being associated with a set of resource blocks, wherein an attempt to access the channel comprises transmission of a preamble message by a sending terminal of the plurality of terminals;

estimating a probability of collision in the channel based on the first number, the second number, and the protocol;

generating a first probability distribution of the time intervals for each of the terminals, based on the estimated probability of collision;

calculating a second probability distribution of the time intervals for each of the terminals;

calculating for each terminal a first cumulative distribution function and a second cumulative distribution function from the first probability distribution and the second probability distribution respectively;

generating a test statistic based on the first cumulative distribution function and the second cumulative distribution function for each terminal;

applying a one-sided statistical goodness of fit test to the test statistic to determine a goodness of fit threshold function;

comparing the second cumulative distribution function and the goodness of fit threshold function for each terminal to identify a malfunctioning terminal not operating in accordance with the protocol, wherein for some time interval in the set of time intervals, the malfunctioning terminal has a second cumulative distribution function value that exceeds the threshold function;

responsive to determining that the base station is in a multi-antenna system and is capable of estimating an angle of arrival of a signal incoming to the base station from the malfunctioning terminal, blocking the signal from the malfunctioning terminal; and responsive to determining that the base station is not in a multi-antenna system or is not capable of estimating an angle of arrival of a signal incoming to the base station from the malfunctioning terminal, re-assigning the channel to a different set of resource blocks and broadcasting information regarding the re-assigning on a broadcast channel.

17. The non-transitory computer-readable storage device of claim 16, wherein the operations further comprise determining that a given terminal is operating in accordance with the protocol, based on a determination that the second cumulative distribution function is less than or equal to the first cumulative distribution function for the terminal.

18. The non-transitory computer-readable storage device of claim 16, wherein the operations further comprise comparing the second cumulative distribution function and the threshold function for each terminal, and determining that a given terminal is operating in accordance with the protocol, based on a determination that the second cumulative distribution function is less than or equal to the threshold function for the terminal.

19. The non-transitory computer-readable storage device of claim 16, wherein the data further comprise an arrival time stamp of the preamble message, and wherein the operations further comprise identifying the sending terminal based on an identifier included in the preamble message, and computing a time interval between access attempts based on the arrival time stamp of the preamble message and an arrival time stamp of a subsequent preamble message.

20. The non-transitory computer-readable storage device of claim 19, wherein timing of messages on the channel is in accordance with frames of a predetermined duration, wherein the preamble message is transmitted on the channel as a packet during a frame, and wherein the time interval comprises a random number of frames.

* * * * *